Figure 1:
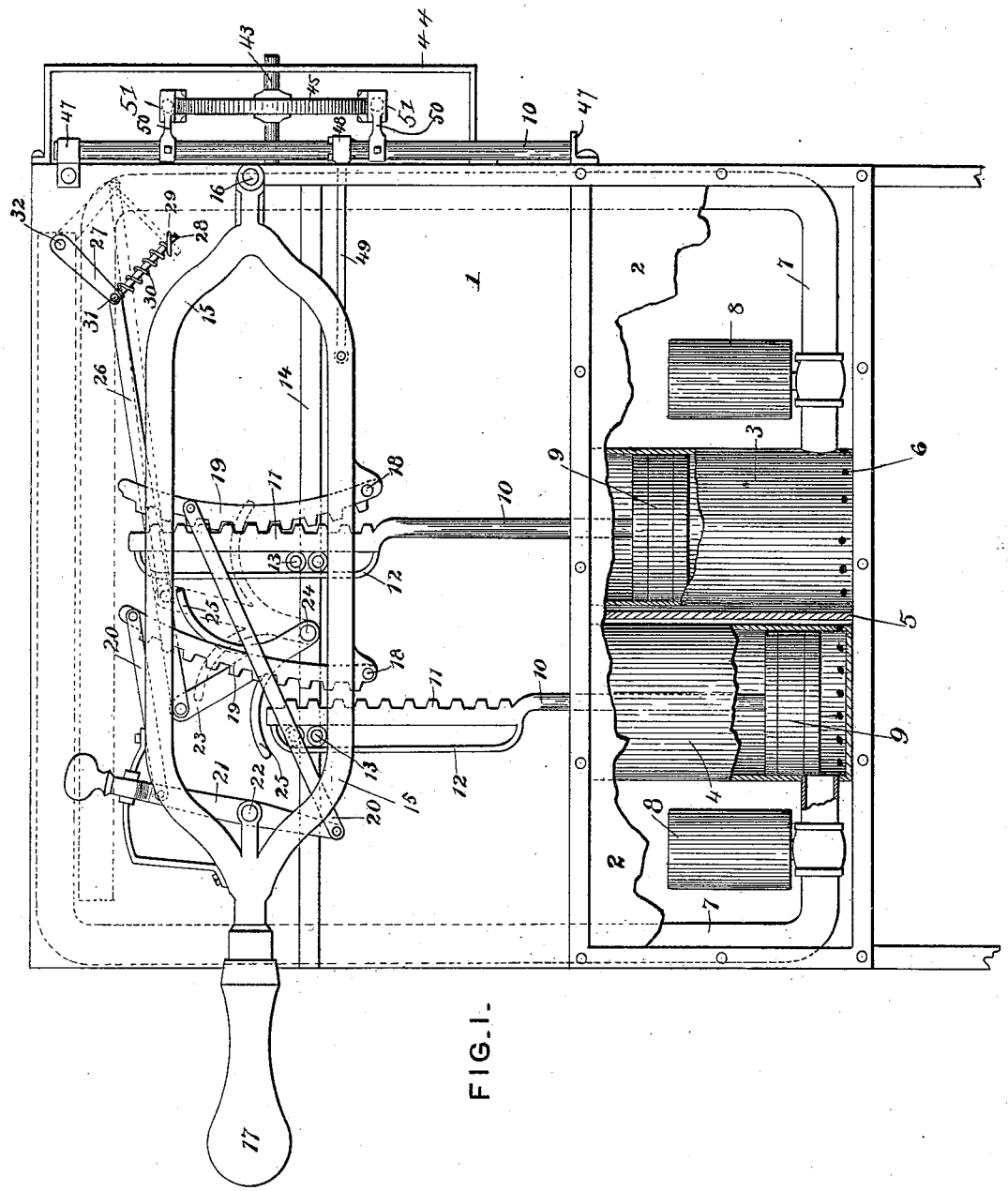

(No Model.) 8 Sheets—Sheet 1.

J. G. COCHRAN.
DISH WASHING MACHINE.

No. 355,139. Patented Dec. 28, 1886.

Attest
Geo. P. Smallwood.
F. A. Hopkins

Inventor:
Josephine G. Cochran
By Knight Bros
Attys

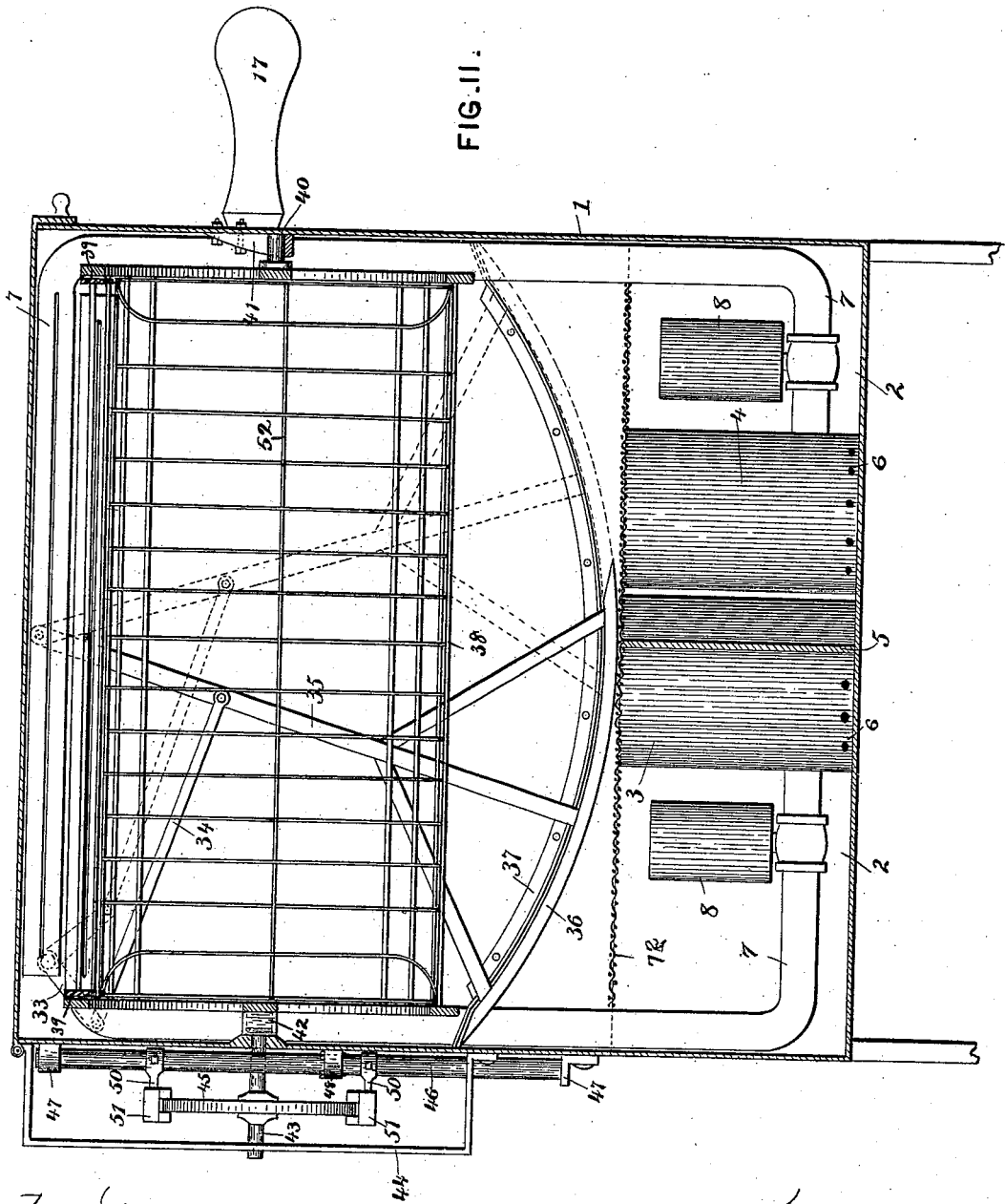

(No Model.)  J. G. COCHRAN.  8 Sheets—Sheet 3.
DISH WASHING MACHINE.
No. 355,139.  Patented Dec. 28, 1886.
FIG. III.
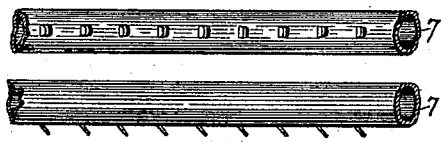
FIG. V.
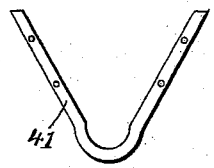
FIG. IV.
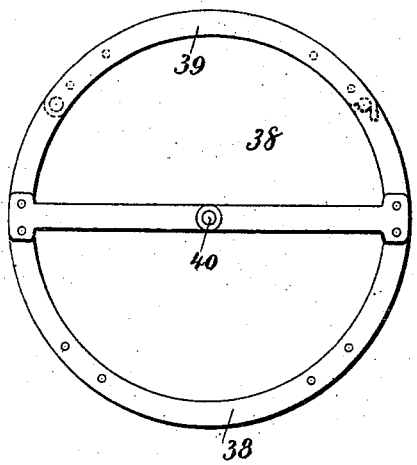
FIG. VI.
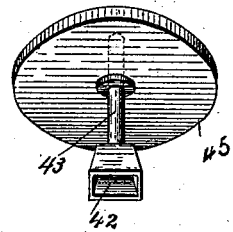
Attest  
Geo. T. Smallwood  
F. A. Hopkins
Inventor:  
Josephine G. Cochran  
By Knight Bros  
attys (No Model.) 8 Sheets—Sheet 4.
J. G. COCHRAN.
DISH WASHING MACHINE.
No. 355,139. Patented Dec. 28, 1886.
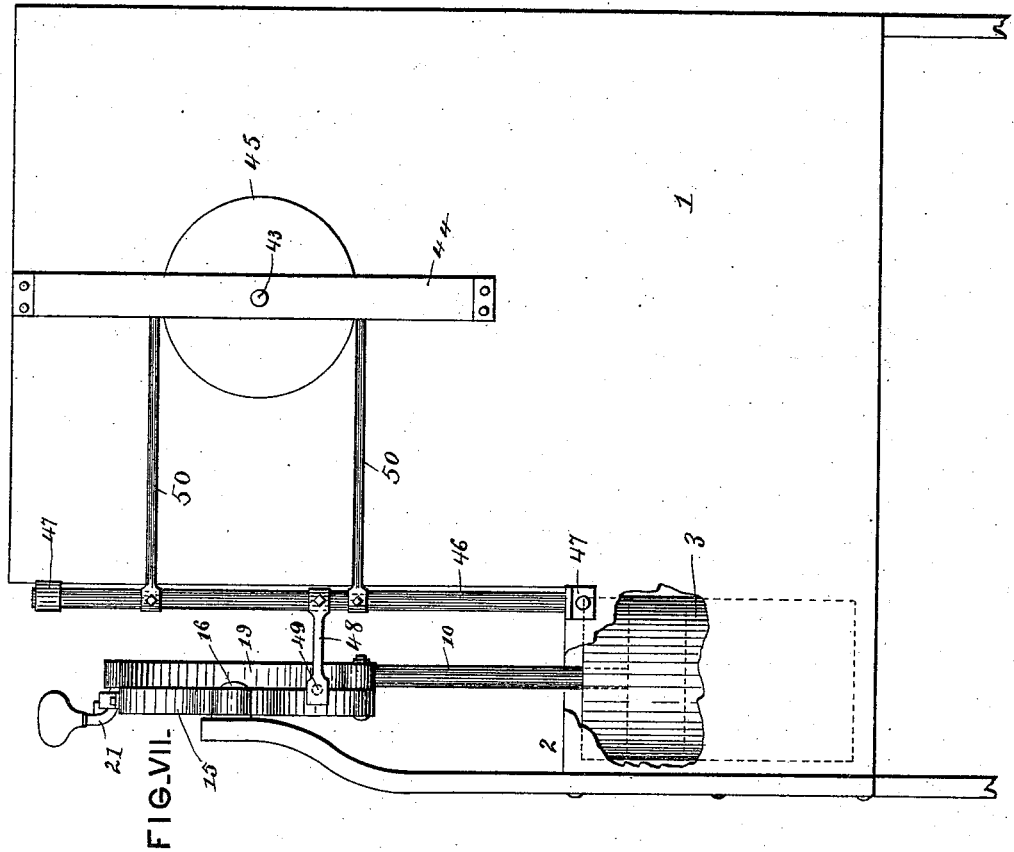

(No Model.) 8 Sheets—Sheet 5.
J. G. COCHRAN.
DISH WASHING MACHINE.
No. 355,139. Patented Dec. 28, 1886.
FIG. VIII.
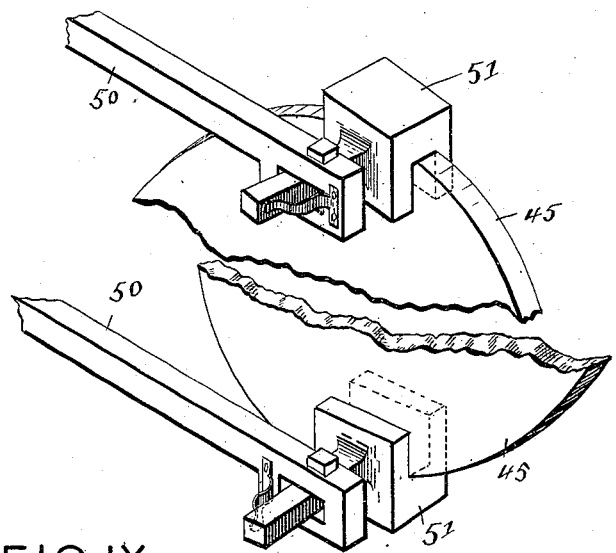
FIG. IX.
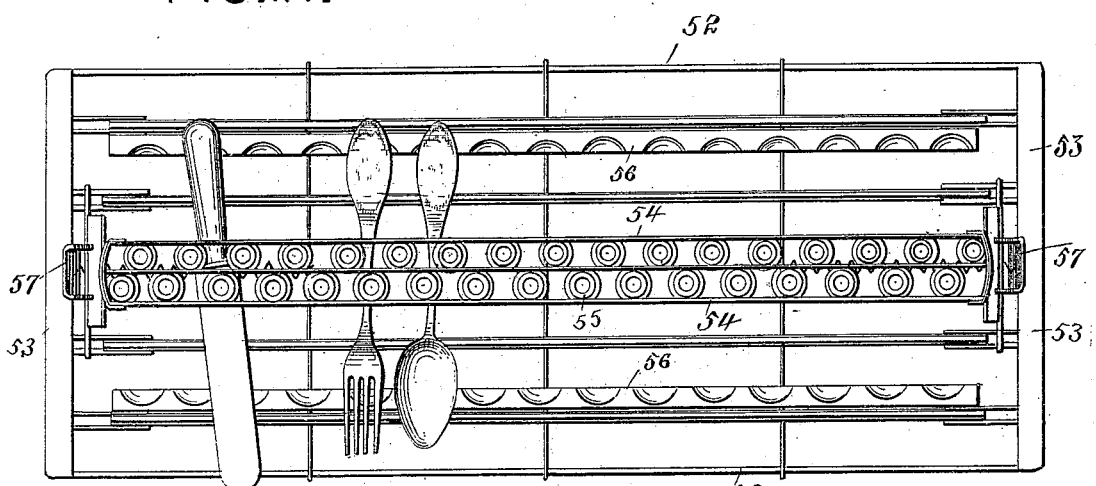
FIG. X.
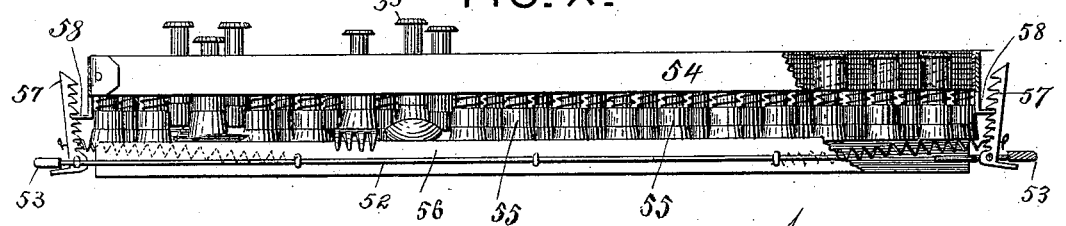
Attest:
F. A. Hopkins
Geo. S. Wheelock
Inventor:
Josephine G. Cochran
By Knight Bros
Atty's.

(No Model.) 8 Sheets—Sheet 6.
J. G. COCHRAN.
DISH WASHING MACHINE.
No. 355,139. Patented Dec. 28, 1886.
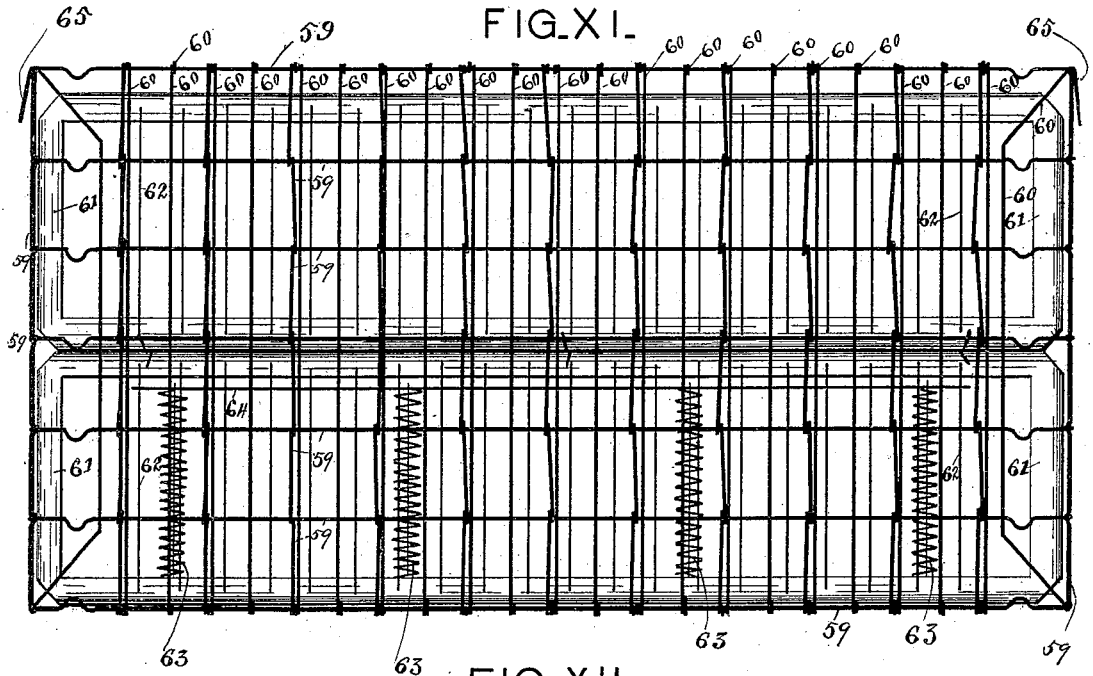
FIG. XI.
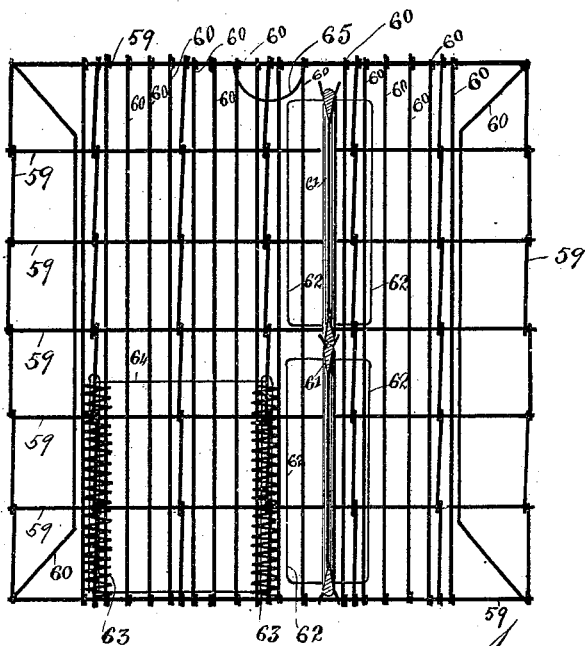
FIG. XII.
Attest:
F. A. Hopkins:
Geo. L. Wheelock.
Inventor:
Josephine G. Cochran
By Knight Bros
Attys.

(No Model.) 8 Sheets—Sheet 7.
J. G. COCHRAN.
DISH WASHING MACHINE.
No. 355,139. Patented Dec. 28, 1886.
FIG. XIII.
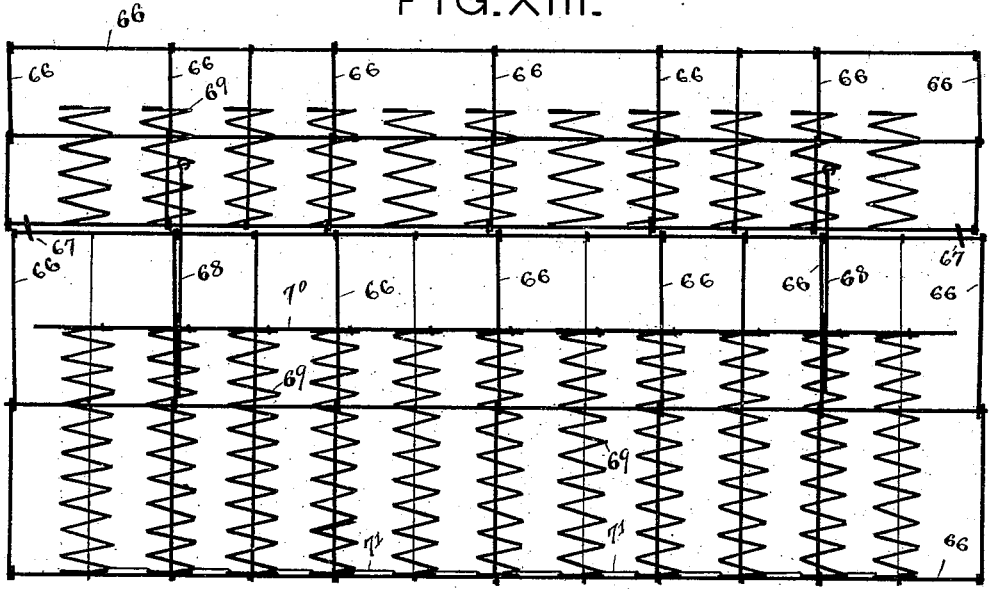
FIG. XIV.
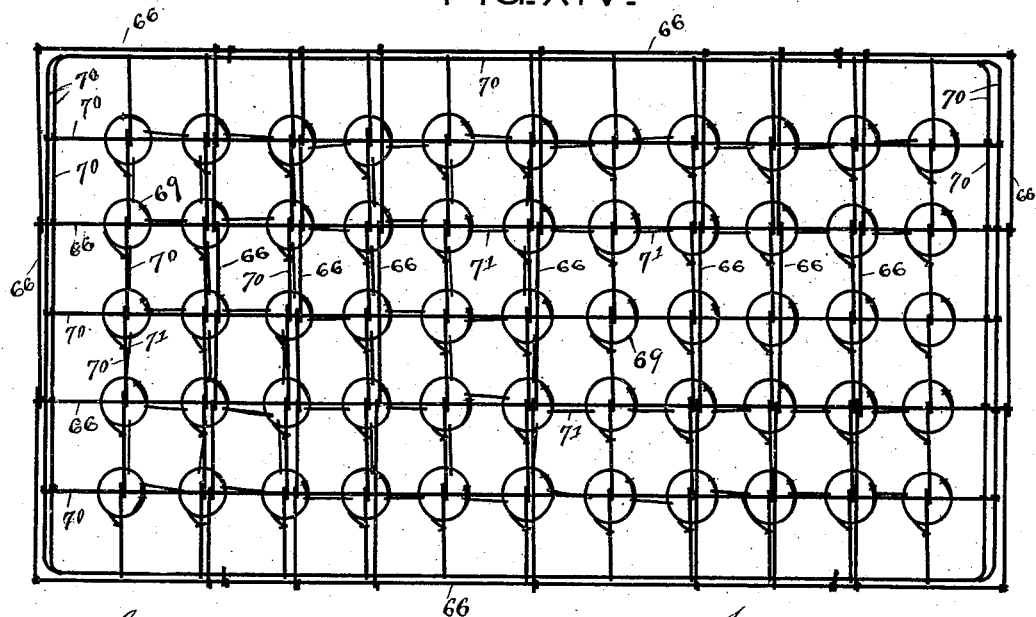
Attest:
F. A. Hopkins.
Geo. L. Wheelock.
Inventor:
Josephine G. Cochran
By Knight Bros
Attys.

(No Model.)  8 Sheets—Sheet 8.
J. G. COCHRAN.
DISH WASHING MACHINE.
No. 355,139.  Patented Dec. 28, 1886.
FIG. XV.
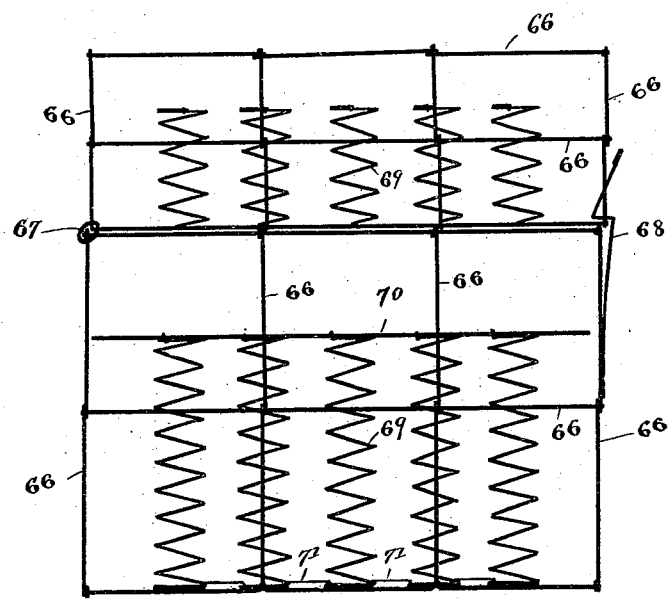

UNITED STATES PATENT OFFICE.

JOSEPHINE G. COCHRAN, OF SHELBYVILLE, ILLINOIS.

DISH-WASHING MACHINE.

SPECIFICATION forming part of Letters Patent No. 355,139, dated December 28, 1886.

Application filed December 31, 1885. Serial No. 187,276. (No model.)

*To all whom it may concern:*

Be it known that I, JOSEPHINE G. COCHRAN, a citizen of the United States, residing at Shelbyville, in the county of Shelby and State of Illinois, have invented a new and useful Improvement in Dish-Washing Machines, of which the following is a specification.

My invention relates to an improvement in machines for washing dishes, in which a continuous stream of either soap-suds or clear hot water is supplied to a crate holding the racks or cages containing the dishes while the crate is rotated so as to bring the greater portion thereof under the action of the water.

The improvement will first be described with reference to the accompanying drawings, and then be more particularly pointed out in the claims.

Figure I represents my improved dish-washing machine in front elevation, parts being broken away to exhibit interior portions. Fig. II is a vertical sectional view of the same, looking from the opposite side. Fig. III shows a bottom view and a side elevation of a portion of the preferred form of the water-spray pipe. Fig. IV is an end elevation of the crate. Fig. V is a side elevation of the supporting-bracket for one end thereof. Fig. VI is a perspective view of the driving disk and shaft of said crate. Fig. VII is a side elevation of the machine, part of the casing being broken away to show one of the pumps. Fig. VIII is a detail view of part of the crate-operating mechanism. Fig. IX is a front elevation, and Fig. X a side elevation, of a rack or cage for knives, forks, and spoons. Figs. XI to XV, inclusive, are side and end elevations and plan of two forms of racks or cages for dishes, plates, &c.

1 may represent a metallic or wooden box, having a forward extension providing two tanks, 2, wherein are situated two force-pumps, 3 4. The lower part of the box is divided into two compartments for the height of the forward extension 2 by a vertical diaphragm, 5, one of the pumps 3 4 being situated in each compartment. This device, with the aid of the movable bottom 36 for box 1, hereinafter described, enables the complete separation of the water in one side of the machine from the other, the soap-suds and clear hot water, when respectively used, being each returned to its appropriate force-pump and used over and over again until it needs renewing.

6 are apertures for allowing water to enter the lower cylinders, 3 4, of the pumps. These apertures may be valved; or a single valved aperture may be substituted therefor.

7 are water-jet pipes extending from the pumps 3 4 at each side of the box 1, and terminating at the top in a horizontal portion, which is either slotted throughout, as shown in Fig. II, or provided with a series of jet-holes, as shown in Fig. III.

8 are air-cushioning chambers in the force-pipes 7.

9 are pump-pistons having rods 10, provided with racks 11 at their upper ends. Strips 12, cast or formed on the rack 11, engage over pins or rollers 13, supported from the cross-bar 14 of the box, and thus guide the piston-rods 10 in vertical paths.

15 is the main operating-lever of the machine, pivoted at 16 to the frame of the box, and provided at its other end with a handle, 17. Pivoted to the lever 15, at 18 18, are two segment-racks, 19 19, connected by rods 20, near their upper ends, with the opposite ends of the vertical lever 21, pivoted at 22 to the main lever 15.

It will be seen that by operating the small lever 21 either of the racks 19 may be thrown against its appropriate piston-rod rack 11, the other segment-rack 19 being simultaneously detached. The lever 15 being then operated, it actuates that pump-piston whose rack is for the time being engaged by one of the segment-racks 19. Simultaneously with the shifting of the operating-lever from one pump to the other, I shift the movable bottom 36, before mentioned, so as to supply water to the tank 2 at one or the other side of the box. This is accomplished by the following mechanism:

23 is a lever, pivoted at 24 to the frame of the box, and having curved arms 25, which occupy positions over one or other of the racks 11, so that upon the operation of one of such racks by the mechanism just described it will at the first stroke, if one of the arms of the lever 23 be at the time above it, throw the lever 23 over its fulcruming-point 24, and thus allow said rack to reciprocate without again coming in contact with the arm 25.

26 is a rod connecting the lever 23 with a crank, 27.

28 is a pin or bolt hinged to the connection between the rod 26 and crank 27 at its upper end, and sliding in a bracket, 29, on the box at its lower end. A spring, 30, surrounding the pin 28 bears on the bracket 29 and crank 27, so as to insure the throwing of such crank, and consequently of the lever 23, to its extreme position as soon as the knuckle-joint at 31 passes to one or the other side of a straight line drawn between the pivot-pin 32 of crank 27 and the center of bracket 29. The pivot-rod 32 is rigidly connected interiorly of the box to a second crank, 33, and thus, by connecting rod 34 with arms 35 of the movable bottom 36, a ledge, 37, is fixed to each side of the box, immediately over the path of the movable bottom 36, so as to direct water falling down the sides of the box onto the bottom.

From the above-described construction it is apparent that as soon as one or other of the pumps is operated the movable bottom is automatically shifted from the appropriate side, so that water is returned to the tank of the pump being used and warded off from the other tank.

An oil or other stove or heater may be placed under one or other of the tanks 2 2, which it is preferred to employ for containing the hot water.

38, Figs. II and IV, is a cylindrical wire crate, wherein the cages containing the dishes to be cleaned are placed.

39 is a door at one side of the crate, having suitable means of fastening. (Not here shown.)

A circular trunnion, 40, at one end of the crate 38 is supported in a bracket, 41, Fig. V, which is fixed to the side of the box and open at top, so as to allow the crate to be readily removed. At its other end the crate has a square projection or trunnion for engaging in a similarly-shaped socket, 42, Fig. VI, on the inner end of a shaft, 43, Fig. II, journaled in the wall of the box and in a bracket, 44.

45 is a friction-disk fixed on the shaft 43 so as to revolve in a vertical plane.

46 is a vertical rock-shaft journaled in brackets 47, and having a horizontal crank-arm, 48, connected by rod 49 with the main operating-lever 15, and having additional horizontal crank-arms, 50, carrying friction-clutches 51. The said clutches engage with opposite sides of the disk 45 in one direction of their motion and not the other, so as to alternately grasp and rotate the same.

During the continuous operation of the lever 15, and while one of the pumps 3 4 is supplying a steady stream of water through the pipes 7 to dishes in the crate 38, the shaft 46 is by its connection with the lever 15 rocked, and the disk 45 and crate 38 slowly rotated, so that all the dishes in the crate are exposed to the stream of water and cleaned. After they are thoroughly cleaned by soap-suds from one pump, the racks 11 19 are shifted so as to bring the other clear-hot-water pump into operation, thus automatically uncovering the proper tank in the bottom of the box. By this means a stream of hot rinsing-water is poured onto the dishes until they are perfectly clean. When they are dry from their own heat they are ready to be put away or immediately again used upon the table, no draining or drying being necessary after their removal from the machine.

To strain off the larger impurities a perforated diaphragm may be placed under the movable bottom of the tank, as shown in Fig. II at 72.

A rack or cage for knives and similar articles is shown in Figs. IX and X. It consists of a frame, 52, preferably of wire, to the end plates, 53, of which are secured the ends of the bars 54, which support a number of spring-clamps, 55. Articles to be washed are laid upon the bars 56 of the frame, and the clamp-bars 54 are then placed over them and are held down by the racks 57, engaging with projections 58 on the ends of the bars 54.

In Figs. XI and XII are shown side and end elevations of a rack for plates, saucers, &c. The outer web of the cage is made of wires 59, so as to be practically rectangular. From each corner wire projects into the case a series of wires, 60, which for the major part of their length are parallel with the outer wires of the cage, and which serve as supports for the plates placed in the cage in vertical position. Frames 61, having vertical wires 62, which may project, as shown, and may be similar to those 60, may be placed between any two of the wires 60 at the ends of the cage, and thus divide the cage into two parts, and at the same time afford an interior bearing for the plates and saucers that are placed within the cage. For articles that require a spring-support below, an interior cushion is provided in one of the compartments of the cage, consisting of springs 63, united by longitudinal and cross bars 64. Handles 65 are provided at each end of the cage for convenience in carrying.

Figs. XIII, XIV, and XV are respectively side elevation, plan, and end elevation of a rack for glass and other hollow articles. The rack or cage is made of wires 66, and is divided into two parts which are hinged together, as shown at 67; but they may be fixed so as to form a rectangular cage by means of catches 68. Within each compartment of this cage a number of spiral springs, 69, are arranged upon a movable frame, 70, and so adapted as to surround the necks and bases of hollow articles, and by pressing them gently against the top and bottom of the cage hold them in position while the cage is being turned within the crate of the dish-washing machine. To increase their power of maintaining the dishes in upright position, the lower ends of the springs 69 are preferably connected by links 71.

Having thus described my invention, the following is what I claim as new therein and desire to secure by Letters Patent:

1. In combination with the box of a dish-washing machine, receptacles or tanks connected therewith and a movable bottom adapted to cover one receptacle and deflect water falling thereon into the other, substantially as set forth.

2. In combination with the box of a dish-washing machine, an operating-lever, pumps, racks on the piston-rods of said pumps, pivoted racks supported on the main operating-lever, and means for throwing one or other of said pivoted racks into engagement with the rack on one of the piston-rods, substantially as set forth.

3. In combination with the box of a dish-washing machine, partitioned as shown, two pumps, means of connecting one or other at will with the operating handle or lever, a movable bottom for the box, and connections therefrom to the pump-pistons, whereby it is automatically shifted as each pump is alternately operated, substantially as set forth.

4. In combination with the box 1, the pump piston-rods and a lever for operating the same, a lever, 23, pivoted to the box, having arms 25, projecting over the piston-rods, and a movable bottom wherewith said lever 23 is connected, substantially as set forth.

5. In combination with the lever 23 and means for shifting the same, a crank, 27, a rod, 26, connecting said crank and lever, a movable bottom operated by said crank, and a spring-bolt, 28 29 30, for throwing said crank and lever to its extreme positions to one side or the other, substantially as set forth.

6. The combination, with a box and rotary crate, of two pumps having independent discharge-pipes, a hinged lever adapted to engage either pump-rod, and a connection, substantially as described, by which the lever rotates the crate while connected with either pump.

7. In combination with a horizontal rotary dish-crate, a horizontal shaft connected thereto, a friction-disk thereon, a vertical rock-shaft carrying friction-clutches engaging with said disk, and an operating-lever connected with said vertical rock-shaft, substantially as set forth.

8. In combination with a rotary dish-crate having a square trunnion at one end for engaging with the operating-shaft and a circular trunnion at the other, a bracket fixed to the box having bearing for the circular trunnion, open at top to permit the removal of the crate, substantially as set forth.

9. A knife-and-fork rack or cage for dish-washing machines, consisting of a frame, 52, provided with end plates, 53, having racks 57, the bars 54, having projections 58, the bars 56, on which the articles are placed, and spring-clamps 55, substantially as described.

10. A plate-and-saucer rack or cage for dish-washing machines, consisting of an approximately rectangular wire cage having an outer web of wires, 59, and the inwardly-projecting vertical wires 60, extending from the corners around the sides and ends, substantially as described.

11. A plate-and-saucer rack or cage for dish-washing machines, consisting of an approximately rectangular wire cage having an outer web of wires, 59, the inwardly-projecting vertical wires 60, extending from the corners around the sides and ends, and the interior frames, 61, having vertical wires 62, similar to the inwardly-projecting vertical wires, substantially as described.

12. A rack for hollow articles, consisting of two wire cages having wires 66, hinged together, means for securing them together at the front, and movable frame 70, spiral springs 69, and connecting-links 71, substantially as described.

JOSEPHINE G. COCHRAN.

Witnesses:
J. WM. LLOYD,
R. L. GARIS.